United States Patent [19]

Raleigh

[11] 4,005,044
[45] Jan. 25, 1977

[54] METHOD OF MAKING AQUEOUS ANTIFOAM COMPOSITIONS

[75] Inventor: William J. Raleigh, Watervliet, N.Y.

[73] Assignee: General Electric Company, Waterford, N.Y.

[22] Filed: June 20, 1975

[21] Appl. No.: 588,700

[52] U.S. Cl. .............................. 252/358; 252/321
[51] Int. Cl.² .................................. B01D 19/04
[58] Field of Search ................................. 252/358

[56] References Cited
UNITED STATES PATENTS

| | | |
|---|---|---|
| 2,894,913 | 7/1959 | Sullivan et al. .................. 252/358 |
| 3,076,768 | 2/1963 | Boylan ............................. 252/358 |
| 3,423,340 | 1/1969 | Marshall et al. .................. 252/358 |
| 3,856,701 | 12/1974 | Householder ..................... 252/358 |

*Primary Examiner*—Leland A. Sebastian
*Attorney, Agent, or Firm*—John L. Young; E. Philip Koltos; Edward A. Hedman

[57] ABSTRACT

A new and improved method of making aqueous, emulsified antifoam compositions is provided in which a silicone oil, a silazane-treated silica filler and emulsifiers are used. The technique permits the silicone oil and silica filler to be added to the composition, independently and directly, and thus avoids the need for first making an antifoam compound of these ingredients.

10 Claims, No Drawings

METHOD OF MAKING AQUEOUS ANTIFOAM COMPOSITIONS

The present invention relates to a new and improved method of making aqueous antifoam emulsions by adding a silazane-treated silica filler to a suspension of a silicone fluid in water containing dissolved emulsifiers. Stable, aqueous, emulsified antifoam compositions can thus be prepared without first having to make an antifoam compound of a silicone fluid and a silica filler.

BACKGROUND OF THE INVENTION

Antifoaming compositions are materials used in the prevention, removal and control of unwanted foam. Foamed fluids are dispersions of air or other gas as the discontinuous phase in a continuous liquid phase. Usually, since air or gas makes up the larger volume portion of such a foam, the bubbles are separated only by a thin liquid film. Unwanted fluid foams are made up of numerous tiny bubbles of a mechanical or chemical origin which are generated within a liquid and which rise and accumulate at the liquid surface faster than they decay.

The fields in which unwanted foams are encountered are very diverse, with problems ranging from unesthetic foams to foams which are hazardous. Foam problems are common in polymerization, paint processing and application, fermentation, sugar-refining, oil drilling and refining, food preparation, paper manufacture, sewage disposal, textile dyeing, adhesive application and conversion of ores refined by flotation. Liquid coolants, hydraulic fluids, lubricants, aviation fuels and gas absorption fluids may foam with undesirable results under conditions of operation. If not properly controlled foam can reduce equipment capacity and increase processing time and expense, as well as cause other disadvantages.

Although foam can be controlled by making basic changes in the process itself, or by using mechanical defoaming equipment, chemical antifoaming compositions having proven to be the most effective and economical. By adding the chemical antifoam compositions to the system, stabilized films are broken, causing the foam bubbles to decay, and thus substantially or completely defoaming the process.

Among the many chemical compositions which are known to be useful for the prevention and destruction of undesirable foams, some of the most effective and versatile anti-foaming agents are silicone fluids. Silicone-based compounds or agents may be used as supplied, as suspensions in solvents or mixed with a portion of a dry ingredient from the foamer formulation.

Emulsions of silicone fluids are also available commercially for use as antifoaming agents. The features which make the use of emulsions desirable include nonflammability, compatibility with aqueous systems, ease of dilution, and effectiveness of these highly dispersed foams of silicones in applications where surface properties are important.

Silicone emulsions are generally made from standard fluids, emulsifying agent, water, and finely divided solids (e.g., silica) which act as carriers for the silicone, increasing the exposed silicone interfacial area and, consequently, the effectiveness of the emulsion as an antifoaming agent. All classes of emulsifiers can be used: anionic, cationic, and nonionic. In most cases, a water-in-oil dispersion is prepared by passing a mixture of silicone fluid, emulsifier, some water, and solid dispersant through a high shear blending device such as a colloid mill or homogenizer. The resulting paste is then dispersed in a larger amount of water with vigorous agitation. The final product is a silicone-in-water emulsion, wherein the silicone fluid may constitute up to 70% of the total emulsified composition. Most silicone emulsions, as sold, contain 10–70% silicone, but are usually diluted to much lower concentration before use. Commercial silicone emulsions are pourable systems of low to moderate viscosity, with good shelf stability and good resistance to phase separation.

The dimethyl silicones, in particular, are especially useful in antifoaming agents because of their low surface tension, inertness and insolubility in water. Moreover, they are useful at low concentrations against a wide range of foamers.

A recently developed class of improved antifoam agents comprises dimethylpolysiloxane compounds containing untreated and/or treated fumed silica (e.g., fumed silica treated with octacyclotetrasiloxane). The general process by which these antifoam compounds are made requires that a mixture of the dimethylpolysiloxane fluid and the untreated and/or treated fumed silica filler is initially heated to about 150° C. in order to disperse the filler. The mixture is homogenized under pressure or milled and cooled. It is then reheated to about 150° C. for a considerable time to insure proper filler wet out. Finally, the mixture is again cooled and transferred to a storage container for subsequent use in antifoam compositions, such as aqueous emulsified antifoam compositions.

It has now been discovered that stable aqueous, emulsified antifoam compositions can be prepared without having to use an antifoam compound. Instead, a silicone fluid and a treated precipitated silica filler are each added directly and separately to the antifoam composition. The present method is less tedious and less time consuming than prior art methods and provides a composition of better defoaming ability and longer shelf stability than aqueous emulsified silicone compositions which employ untreated precipitated silica or treated fumed silica.

DESCRIPTION OF THE INVENTION

In accordance with the present invention, stable, emulsified antifoam compositions are prepared by a method which comprises:

i. dissolving an emulsifying agent in water;
ii. dispersing a dimethylpolysiloxane fluid in the solution of the emulsifying agent;
iii. admixing a silazane-treated precipitated silica filler with the dispersion produced in step (ii); and
iv. milling the mixture of step (iii) until there is produced a composition which is homogeneous and incapable of separating into two layers.

An especially preferred method of practicing the present invention involves dissolving the emulsifying agent in water at a temperature in the range of from about 60° C. to about 70° C., dispersing a dimethylpolysiloxane fluid in the solution of emulsifying agent at a temperature about about 60° C., admixing a silazane-treated precipitated silica filler with this dispersion while maintaining the temperature above about 60° C., and thereafter cooling the mixture to a temperature of about 55° C. and milling the cooled mixture.

The treated, precipitated silica filler is prepared by admixing the same with a silazane, e.g., hexamethyldisilazane, at a temperature of from about 25° C. to about 150° C. for about 1 to 2 hours and, preferably, at room temperature for about 1 hour. Ammonia is liberated as a by-product.

With regard to the materials used in the present method, any of the well-known linear dimethylpolysiloxane fluids having a viscosity in the range of from about 100 to about 70,000 centistokes at 25° C. are suitable for the present purposes. For example, dimethylpolysiloxane fluids represented by the following general formula are suitable:

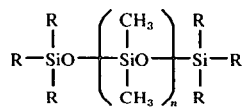

wherein each R is the same or different and selected from monovalent hydrocarbon and substituted hydrocarbon radicals, such as aliphatic, haloaliphatic and cycloaliphatic, e.g., alkyl, alkenyl, cycloalkyl, haloalkyl, including methyl, ethyl, propyl, butyl, chlorobutyl, cyclohexyl, trifluoropropyl, aryl radicals, and halogenated aryl radicals, such as phenyl, chlorophenyl; alkenyl radicals such as xylyl, tolyl, and the like; aralkyl radicals, such as phenylethyl, benzyl, and the like; cyanoalkyl, such as cyanoethyl; and $n$ is sufficient to provide a viscosity of from about 100 to about 70,000 centistokes at 25° C. Preferably, all the R groups in the above formula are methyl, and it is also preferred that the viscosity of the dimethylpolysiloxanes used in the practice of this invention is from about 100 to about 30,000 centistokes at 25° C. and most preferably from about 300 to about 1,000 centistokes at 25° C.

Any of the well-known and/or commercially available precipitated silica fillers are useful in the practice of the present invention. These precipitated silica fillers are high surface area materials, the surface area generally being in the range of from about 100 to about 800 $m^2/g$ and are generally prepared by the depolymerization of high purity sand, which is a crystalline form of silica, to produce soluble silicate, which in turn is treated to cause repolymerization and precipitation of extremely particulate amorphous filler. The resultant silica is a fine white powder, the particles of which have fully hydroxylated surfaces, covered by moisture layers. For purposes of this invention the moisture content is generally in the range of from about 1 to about 15% by weight. Most preferably, the precipitated silicas employed herein have a moisture content of from about 7 to about 10% by weight.

Specifically, preferred precipitated silica fillers useful in the practice of the present invention are commercially available from, for example, the Philadelphia Quartz Company, sold under the name of QUSO-F22; SCM Glidden Durkee Company, sold as Silcron G-100; the J. M. Huber Corp., sold as Zeothex 95; and the W. R. Grace Co., sold as Syloid 266. All of these precipitated silica fillers are generally identified as hydrated silicon dioxide having a surface area of from about 300 to 400 $m^2/g$, having a moisture content of from about 7 to about 10% by weight.

The emulsifying agent is a compound or compounds selected from among conventional emulsifiers, e.g., oxyethylene sorbitan monostearate (Tween 60), sorbitan monostearate (Span 60), polyoxyethylene stearate (Myrj 52S), and mixtures thereof. Especially preferred is a mixture of sorbitan monostearate (Span 60) and polyoxyethylene stearate (Myrj 52S), commercially available from Atlas Chemical.

Of course, other additives which are generally used in antifoam compositions of the present type are also contemplated herein in minor but effective amounts, including bactericides. Sorbic acid is especially preferred as a bactericide, and is preferably added in the present method after the milling step to the milled homogeneous composition.

The amounts of the ingredients employed in the present process may vary within wide limits. Generally, however, the amount of silazane used, e.g., hexamethyldisilazane, is from about 8 to 20% by weight, based on the amount of precipitated silica filler employed. Generally, the amount of silazane-treated precipitated silica filler used in the practice of this invention is from about 0.05 to about 1% by weight of the total composition, the amount of dimethylpolysiloxane ranges from about 25 to about 35% by weight and the amount of emulsifying agent ranges from about 10 to about 20% by weight, with the balance of the composition comprising water and minor but effective amounts of additives, such as bactericides. An especially preferred amount of bactericide is from about 0.05 to about 2% by weight.

The practice of the present invention is illustrated in the following examples, which are not to be construed as limiting this invention to the embodiments disclosed therein.

EXAMPLE 1

A stable, aqueous, emulsified antifoam composition is prepared according to the present invention, as follows:

18 parts by weight of water are charged to a suitable cleaned premix vessel and heated to a temperature of from about 60° C. to 70° C. While this temperature is maintained, 8.3 parts by weight of emulsifier (Span 60) and 5.7 parts by weight of emulsifier (Myrj 52S) are added with rapid agitation, and the agitation is continued for about 30 minutes after the addition. 31.1 parts by weight of dimethylsilicone oil are slowly added while keeping the temperature above 60° C., and the mixture is agitated rapidly for about 30 minutes. Four-tenths part by weight of treated filler are now added, then 36.3 parts by weight of water are added with rapid agitation, and mixing is continued for one hour. After completion of the premix agitation, the batch is cooled to about 53° to 57° C., and milled on a Manton-Gaulin colloid mill, at about 3 to 5 mils, into a dilution kettle where moderate agitation is maintained. About 0.2 parts by weight of sorbic acid bactericide are added to the milled dispersion and moderate agitation is continued for about 30 minutes. The emulsifiers are products of Atlas Chemical (ICI America). Equivalents are available, e.g., from Mayer Chemical, Hodag Co., and the like.

The composition prepared by this procedure exhibits the following physical properties:

| Property | Value |
| --- | --- |
| Viscosity (cps.) | 320 |
| Centrifuge stability | T-1cc cream |
| Solids (Weight %) | B-.25 cc heavy cream |

| Property | Value |
| --- | --- |
| Defoam (mg/ml) | 45.2 |

The defoam test is carried out as follows:

Equipment. - 2 beater kitchen-mixer, 1500 ml.* beaker; 4 dram vial with dropper, analytical balance, 50 ml. burette graduated to 0.1 ml., 0.5% solution of sodium lauryl sulfate.

* If necessary, a 1/2 gal. ice cream container may be substituted for the 1500 ml. beaker.

Note. - The timing sequence for the successive additions of reagent and sample which are described in the procedure are to be duplicated as closely as possible. The elapsed time between successive addition of sodium lauryl sulfate solution is to be no greater than 30 seconds.

Use in this sequence toluene, acetone and distilled water to rinse the beaker and beaters between tests.

A test temperature of 25° C. is recommended. Record the actual test temperature.

Procedure. -

1. To a 1500 ml.* beaker which has been arranged for mixing with a mixer add 200 ml. of distilled water. The mixer is to be equipped with two beaters only. Set the mixer at maximum speed.
2. Add at maximum rate 0.5% Sodium Lauryl Sulfate solution until a foam height which just covers the beaters is formed. (Always refill burette before making additions.)
3. Immediately add enough sample to collapse the foam (usually 1 to 2 drops when pre-conditioning).
4. After the foam level has subsided again add at maximum rate the 0.5% Sodium Lauryl Sulfate as described in Step 2.
5. Add 2 drops of sample.
6. After the foam level has subsided shut the mixer off. The time interval between the following two steps should be no longer than 10 minutes.
7. Weigh a weighing bottle containing approximately 10 gms. of sample and a medicine dropper to ±0.001 gms. Record the weight as $W_1$.
8. Turn the mixer to maximum speed. Record the volume of Sodium Lauryl Sulfate reagent in the burette. Repeat Step 2 (each time noting the volume of reagent used) and Step 3 until five successive additions of reagent and sample have been made.
9. Weigh the weighing bottle with sample and dropper. Record the weight as $W_2$.
10. Total the volume of each of the five additions of Sodium Lauryl Sulfate added in Step 8. Record the volume as $V_T$. Divide by 5 to obtain the average volume, $V_A$. Divide the average by 4. Add and subtract this result to $V_A$ to give the range $V_L - V_U$.

Compare each of the five individual volumes to this range. They must fall within the range or else the test is to be repeated.

11. Calculate the ratio, R, of the total weight in mgm. of sample used to the total volume in ml. of Sodium Lauryl Sulfate used.

$$R = \frac{W_1 - W_2}{V_T}$$

12. Convert milligrams of sample/ml. of Sodium Lauryl Sulfate solution to mg. silicone/ml. as follows:

$$\text{mg. silicone/ml.} = \frac{R}{f}$$

It is seen from the above detailed description that the present invention provides a beneficial process for the production of antifoam emulsions using dimethylpolysiloxane oil and a silica filler, instead of a conventional antifoam compound. The filler should be a silazane, - especially a hexamethyldisilazane-treated precipitated silica. Obviously, modifications can be made without departing from the scope or spirit of the invention. All such obvious variations are embraced by the full intended scope of the appended claims.

What is claimed is:

1. A method of making a stable, emulsified antifoam composition, which comprises:
   i. dissolving an emulsifying agent in water;
   ii. dispersing a dimethylpolysiloxane fluid in the solution of the emulsifying agent;
   iii. admixing a silazane-treated precipitated silica filler with the dispersion produced in step (ii); and
   iv. milling the mixture of step (iii) until there is produced a composition which is homogeneous and incapable of separating into two layers.

2. A method as defined in claim 1 which further comprises adding a bactericide to the milled homogeneous composition.

3. A method as defined in claim 2 wherein the bactericide is sorbic acid.

4. A method as defined in claim 1 wherein the filler is a hexamethyldisilazane-treated precipitated silica filler.

5. A method as defined in claim 1 wherein the dimethylpolysiloxane fluid has the general formula

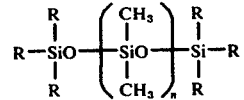

wherein each R is the same or different and is selected from the group consisting of aliphatic radicals, haloaliphatic radicals, cycloaliphatic radicals, cyanoalkyl radicals, aryl radicals, alkaryl radicals, haloaryl radicals and aralkyl radicals and n is a number sufficient to provide a viscosity from about 100 to about 70,000 centistokes at 25° C.

6. A method as defined in claim 1 wherein the emulsifying agent consists of a mixture of sorbitan monostearate and polyoxyethylene stearate.

7. A method of making a stable, emulsified antifoam composition, which comprises:
   i. dissolving an emulsifying agent in water at a temperature in the range of from about 60° C. to about 70° C.;
   ii. dispersing a dimethylpolysiloxane fluid in the solution of emulsifying agent at a temperature above about 60° C.;

iii. admixing a hexamethyldisilazane-treated precipitated silica filler with the dispersion of step (ii) while maintaining the temperature above about 60° C., and thereafter cooling the mixture to a temperature of about 55° C.; and
iv. milling the cooled mixture of step (iii) until there is produced a composition which is homogeneous and incapable of separation into two layers.

8. A method as defined in claim 7 wherein the amount of dimethylpolysiloxane ranges from about 25 to about 35% by weight, the amount of treated, precipitated silica filler ranges from about 0.05 to about 1% by weight, the amount of emulsifying agent ranges from about 10 to about 20% by weight and the balance comprises water.

9. A method of making a stable, emulsified antifoam composition, which comprises:
   i. dissolving from about 10 to about 20% by weight of an emulsifying agent in water at a temperature of from about 60° C. to about 70° C., said emulsifying agent being selected from the group consisting of oxyethylene sorbitan monostearate, polyoxyethylene stearate, sorbitan monostearate and mixtures thereof;
   ii. dispersing a dimethylpolysiloxane fluid in a solution of said emulsifying agent at a temperature above about 60° C.;
   iii. admixing from about 0.05 to about 1% by weight of a silazane-treated precipitated silica filler with the dispersion of step (ii) while maintaining the temperature above about 60° C., and thereafter cooling the mixture to a temperature of about 55° C.; and
   iv. milling the cooled mixture of step (iii) until there is produced a composition which is homogeneous and incapable of separation into two layers.

10. A method as defined in claim 9 wherein said silazane-treated precipitated silica filler is a hexamethyldisilazane-treated precipitated silica filler.

* * * * *